US012692370B2

(12) United States Patent
Dai et al.

(10) Patent No.: US 12,692,370 B2
(45) Date of Patent: Jul. 28, 2026

(54) POLYAMIDE COMPOSITE AND PREPARATION METHOD THEREOF

(71) Applicant: KINGFA SCI. & TECH. CO., LTD., Guangdong (CN)

(72) Inventors: Jian Dai, Guangdong (CN); Nanbiao Ye, Guangdong (CN); Xianbo Huang, Guangdong (CN); Chao Ding, Guangdong (CN); Yiquan Zheng, Guangdong (CN); Xuefeng Jin, Guangdong (CN); Feng Wang, Guangdong (CN); Zeyu Hu, Guangdong (CN)

(73) Assignee: KINGFA SCI. & TECH. CO., LTD., Guangdong (CN)

( * ) Notice: Subject to any disclaimer, the term of this patent is extended or adjusted under 35 U.S.C. 154(b) by 796 days.

(21) Appl. No.: 17/783,274

(22) PCT Filed: Oct. 27, 2020

(86) PCT No.: PCT/CN2020/124016
§ 371 (c)(1),
(2) Date: Jun. 8, 2022

(87) PCT Pub. No.: WO2021/114912
PCT Pub. Date: Jun. 17, 2021

(65) Prior Publication Data
US 2023/0027263 A1 Jan. 26, 2023

(30) Foreign Application Priority Data
Dec. 12, 2019 (CN) .......................... 201911273761.3

(51) Int. Cl.
*C08K 13/04* (2006.01)
(52) U.S. Cl.
CPC .................................... *C08K 13/04* (2013.01)
(58) Field of Classification Search
CPC .................................................... C08K 13/04
USPC ........................................................ 523/206
See application file for complete search history.

(56) References Cited

U.S. PATENT DOCUMENTS

2006/0183835 A1 8/2006 Hoerold et al.
2018/0194907 A1* 7/2018 La Camera ............ C08K 5/101

FOREIGN PATENT DOCUMENTS

| CN | 103492488 | 1/2014 |
| CN | 105504797 | 4/2016 |
| CN | 107873040 | 4/2018 |
| CN | 111138850 | 5/2020 |
| DE | 2646835 | 4/1978 |
| DE | 102014215370 | 3/2015 |
| JP | H02196856 | 8/1990 |
| JP | H10204212 | 8/1998 |
| JP | 2007246637 | 9/2007 |
| WO | 03037968 | 5/2003 |
| WO | WO-2012146624 A1 * | 11/2012 ............... C08K 3/02 |

OTHER PUBLICATIONS

A.I. Balabanovich et al., "Fire Retardance in Polyamide-6. The Effects of Red Phosphorus and Radiation-induced Cross-links", Fire and Materials, Apr. 2002, pp. 179-184.
Alexandr I. Balabanovich et al., "Fire Retardance in Polyamide-6,6. The Effects of Red Phosphorus and Radiation-Induced Cross-Links", Macromolecular Materials and Engineering, Mar. 2022, pp. 187-194.
Shifeng Zhu et al., "Thermal and anti-dripping properties of γ-irradiated PA6 fiber with the presence of sensitizers", Materials Letters, Oct. 2012, pp. 28-30.
"International Search Report (Form PCT/ISA/210) of PCT/CN2020/124016," mailed on Jan. 28, 2021, with English translation thereof, pp. 1-6.

* cited by examiner

*Primary Examiner* — Deve V Hall
(74) *Attorney, Agent, or Firm* — JCIPRNET

(57) ABSTRACT

The present invention provides a polyamide composite, including the following components: 20 to 80 parts of a polyamide resin; 1 to 30 parts of a red phosphorus flame retardant; 0.01 to 10 parts of trimethallyl isocyanurate; and the polyamide composite has a cross-linked structure between polyamide molecules. By adding trimethallyl isocyanurate (TMAIC) for irradiation cross-linking treatment, and by the red phosphorus flame retardant, not only the polyamide composite can meet the needs of flame retardant, but also glow-wire ignition temperature (GWIT) and comparative tracking index (CTI) have been improved.

9 Claims, No Drawings

POLYAMIDE COMPOSITE AND PREPARATION METHOD THEREOF

CROSS-REFERENCE TO RELATED APPLICATION

This application is a 371 of international application of PCT application serial no. PCT/CN2020/124016, filed on Oct. 27, 2020, which claims the priority benefit of China application no. 201911273761.3, filed on Dec. 12, 2019. The entirety of each of the above mentioned patent applications is hereby incorporated by reference herein and made a part of this specification.

TECHNICAL FIELD

The present invention relates to the technical field of polymer materials, and in particular, to a polyamide composite and a preparation method thereof.

DESCRIPTION OF RELATED ART

Polyamide is a polymer material with excellent comprehensive properties. Due to the strong hydrogen bond interaction between its molecular chains, polyamide exhibits excellent mechanical strength, especially for glass fiber-reinforced polyamide materials, which are widely used in automobiles, electric tools, rail transportation and other fields due to its excellent mechanical properties.

Irradiation cross-linking is a technical means that uses various radiations to initiate cross-linking reactions between polymer long chains. According to the polymer type and performance requirements, an irradiation source can be selected from electron beams, gamma rays, neutron beams, particle beam, etc. For polyamide materials, due to the strong hydrogen bonding between molecular chains, simple irradiation treatment is difficult to induce the cross-linking of polyamides. Therefore, it is necessary to promote the cross-linking reaction of the system by introducing a co-crosslinking agent, so as to obtain an irradiation crosslinked material.

Generally, irradiation crosslinkers that can be used in polyamide include triallyl cyanurate (TAC), triallyl isocyanurate (TAIL), and trimethallyl isocyanurate (TMAIC).

Patent JPH02196856A discloses a brominated flame retardant irradiation cross-linked polyamide composite, which uses triallyl cyanurate (TAC) or triallyl isocyanurate (TAIC) as a cross-linking agent, and an ion beam is used to irradiate the material, and finally the irradiation cross-linked polyamide material is obtained. However, due to the fact that the composite is brominated flame retardant polyamide and TAC or TAIC as a cross-linking agent has insufficient anti-leakage properties, the properties such as the tracking index show certain disadvantages.

In general, irradiation cross-linked polyamide materials have been gradually applied in electronic and electrical fields, but the development and application of such materials are still in their infancy, types of the materials are few, the existing flame-retardant irradiation cross-linked polyamide materials still have certain defects, and there are certain risks in the application side. In addition, the cross-linking agent TAIL, which is widely used in irradiation cross-linked polyamide materials, has insufficient thermostability and is prone to decomposition at high processing temperatures, resulting in insufficient cross-linking reaction during irradiation, and eventually resulting in a very limited improvement in the overall performance of the material.

SUMMARY

An objective of the present invention is to provide a polyamide composite, by adding TMAIC for irradiation cross-linking treatment, and adding red phosphorus flame retardant simultaneously, so that polyamide composite can not only meet the needs of flame retardant, but also glow-wire ignition temperature (GWIT) and comparative tracking index (CTI) have been improved.

Another objective of the present invention is to provide a preparation method of the polyamide composite.

The present invention is achieved by the following technical solutions.

A polyamide composite includes the following components:

20 to 80 parts of a polyamide resin;

1 to 30 parts of a red phosphorus flame retardant; and 0.01 to 10 parts of trimethallyl isocyanurate, the polyamide composite has a cross-linked structure between polyamide molecules.

Characterization of the Cross-Linked Structure:

accurately weighing 0.3 g of polyamide composite irradiated samples with different doses, and putting into a Soxhlet extractor. After extraction with m-cresol for 48 hours and methanol for 24 hours, polyamide residues remained, and the polyamide molecules in the polyamide composite has the cross-linked structure.

After the irradiation cross-linking treatment, the $\alpha$-carbon next to the amino group in the polyamide segment will be broken, forming new chemical bonds with other molecular chains, and then forming a cross-linked network structure. After the cross-linked structure is formed, m-cresol and methanol cannot be dissolved, and swelling will occur. However, the polyamide resin without cross-linking can be almost completely dissolved.

The polyamide resin is selected from polyamide resins obtained by polycondensation of diamine units and dicarboxylic acid units, polyamide resins obtained by ring-opening polymerization of lactam units, and polyamide resins obtained by self-condensation of aminocarboxylic acid units, or a polyamide copolymer resin obtained by copolymerizing at least two of the above-mentioned units constituting these polyamide resins.

The red phosphorus flame retardant is selected from a red phosphorus powder or a red phosphorus flame retardant masterbatch.

In the red phosphorus flame retardant masterbatch, red phosphorus accounts for 10% to 15% of a total weight. The red phosphorus flame retardant masterbatch is coated with a coating material. The coating material is selected from at least one of inorganic hydroxide, phenolic resin, epoxy resin and melamine formaldehyde resin.

The polyamide composite further includes 0 to 50 parts of a glass fiber. The glass fiber is selected from at least one of an E-glass fiber, an H-glass fiber, an R,S-glass fiber, a D-glass fiber, a C-glass fiber, and a quartz glass fiber.

Preferably, the glass fiber is selected from the E-glass fiber.

The glass fiber has a diameter of 7 to 18 microns.

Preferably, the diameter of the glass fiber is 9 to 15 microns.

In parts by weight, the polyamide composite further includes 0 to 10 parts of an additive. The additive is selected from at least one of a colorant, a flexibilizer and an anti-oxidant.

The colorant is not limited to the following substances, for example: dyes such as aniline black, pigments such as titanium oxide and carbon black; metal particles such as aluminum, colored aluminum, nickel, tin, copper, gold, silver, platinum, iron oxide, stainless steel and titanium; metallic pigments such as pearlescent pigment of mica, colored graphite, colored glass fiber and colored glass flake. Specifically, it can be PE-based carbon black masterbatch.

The antioxidant, selected from hindered phenolic antioxidants, is selected from but not limited to the following substances, for example: n-octadecyl 3-(3', 5'-di-tert-butyl-4'-hydroxyphenyl)propionate, n-octadecyl 3-(3'-methyl-5-tert-butyl-4'-hydroxyphenyl)propanoate, n-tetradecyl 3-(3', 5'-di-tert-butyl-4'-hydroxyphenyl) propanoate, 1,6-hexanediol bis(3-(3,5-di-tert-butyl-4-hydroxyphenyl) propionate), tetrakis(methylene-3-(3',5'-di-tert-butyl-4'-hydroxyphenyl)propionate)methane, 3,9-bis[2-(3-(3-tert-butyl-4-hydroxy-5-methylphenyl)propionyloxy)-1,1-dimethylethyl]-2,4,8,10-tetraoxaspiro[5,5]undecane, etc.

The flexibilizer, specifically can be: a terpolymer of ethylene, acrylate and glycidyl methacrylate, a copolymer of ethylene and butyl acrylate, a copolymer of ethylene and methyl acrylate, a copolymer of ethylene, n-butyl acrylate and glycidyl methacrylate, a copolymer of ethylene and maleic anhydride, an ethylene/propylene/diene copolymer grafted with maleic anhydride, a styrene/maleimide copolymer grafted with maleic anhydride, a styrene/ethylene/butylene/styrene copolymer modified with maleic anhydride, a styrene/acrylonitrile copolymer grafted with maleic anhydride, an acrylonitrile/butadiene/styrene copolymer grafted with maleic anhydride, and a hydrogenated form thereof.

A preparation method of the polyamide composite includes the following steps: weighing the polyamide resin, the red phosphorus flame retardant, the trimethallyl isocyanurate, and the additive in proportion, and premixing in a high-speed mixer to obtain a premix, and then putting the premix into a twin-screw extruder for melt mixing (if there is glass fiber, add it by side feeding), and extruding and granulating to obtain a workpiece; wherein, a screw length-diameter ratio of the twin-screw extruder is 40:1 to 48:1, a screw barrel temperature is 240° C. to 300° C., and a screw speed is 200-550 rpm; the extruded and granulated polyamide composite is injection-molded, with an injection moulding temperature of 270° C. to 300° C., and an injection moulding pressure of 55 to 100 MPa; and performing an irradiation cross-linking treatment to the workpiece, during the treatment, using an electron beam as an irradiation source, with an irradiation dose of 15 to 25 Mrad, to obtain the polyamide composite.

The present invention has the following beneficial effects.

In the present invention, by selecting and using trimethallyl isocyanurate (TMAIC) as the irradiation cross-linking additive, and by selecting and using the red phosphorus flame retardant, the prepared polyamide composite not only has excellent flame retardant effect, but also has excellent electrical properties (glow-wire ignition temperature (GWIT) and comparative tracking index (CTI) have been improved).

DESCRIPTION OF THE EMBODIMENTS

The present invention will be further described below in conjunction with specific examples and comparative examples. The following specific examples are all preferred embodiments of the present invention, but the embodiments of the present invention are not limited by the following examples, especially not limited to the model of raw material of each component used in the following specific examples.

The sources of raw materials used in the present invention are as follows:

polyamide A: polyamide 66, designation: PA66 EP-158;

polyamide B: polyamide 6, designation: PA6 HY2800A;

red phosphorus flame retardantA: red phosphorus powder, MM-F1, Suzhou Meimao New Material Co., Ltd.;

red phosphorus flame retardantB: red phosphorus flame retardant masterbatch, red phosphorus content is 13%, coating resin is phenolic resin;

red phosphorus flame retardantC: red phosphorus flame retardant masterbatch, red phosphorus content is 9%, coating resin is phenolic resin;

trimethallyl isocyanurate (TMAIC): designation: FARIDA H-2, Farida Chemical Co., Ltd.;

other flame retardant A: aluminium diethylphosphonate, phosphorus content is 23% to 24%, Clariant AG;

other flame retardant B: melamine cyanurate, Shouguang Weidong Chemical Co., Ltd.;

other flame retardant C: condensed aluminum phosphate, Shijiazhuang City Xinsheng Chemical Co., Ltd.;

antioxidant: hindered phenols, designation: IRGANOX 1098, BASF;

colorant: designation: UN2005, PE-based carbon black masterbatch, Cabot Corporation;

flexibilizer: designation: Elvaloy AC resin 1125, EMA-type flexibilizer, DuPont;

chopped glass fiber A: ECS11-4.5-560A, E-glass fiber, China Jushi, with a diameter of 11 microns;

chopped glass fiber B: S-1 TM435HM-10-3.0, S-glass fiber, Taishan Fiberglss INC., with a diameter of 10 microns;

TAC: Evonik Degussa Investment Co., Ltd.;

TAIC: Evonik Degussa Investment Co., Ltd.

A preparation method of polyamide composites in Examples and Comparative Examples 2 to 6: a polyamide resin, a red phosphorus flame retardant, trimethallyl isocyanurate, and additive were weighed in proportion and premixed in a high-speed mixer to obtain a premix, and then the premix was put into a twin-screw extruder for melt mixing, and extruded and granulated to obtain a workpiece. In particular, a screw length-diameter ratio of the twin-screw extruder was 40:1 (a glass fiber was side-fed on the 5-6 section of the screw), a screw barrel temperature was 240° C. to 300° C., and a screw speed was 300 rpm. The flame retardant polyamide composite extruded and granulated was injection-molded, and an injection moulding temperature was 280° C., and an injection moulding pressure was 70 MPa. The workpiece was subjected to irradiation cross-linking treatment to obtain the polyamide composite, during the treatment, an electron beam was used as an irradiation source, and an irradiation dose was 20 Mrad.

A preparation method of a polyamide composite of Comparative Example 1: the preparation method is the same as the preparation method of the Examples except that the irradiation cross-linking treatment was not performed.

Test Methods for each performance:

(1) Flame retardant performance: According to the relevant standards of UL 94, the flame retardant performance of a sample strip is tested, and the sample has a thickness of 0.8 mm;

(2) CTI: The highest voltage value that the surface of the material can withstand 50 drops of electrolyte (0.1% ammonium chloride aqueous solution) without forming tracking, the unit is V. The CTI performance test is carried out according to the relevant regulations in the standard IEC-60112, and the thickness of the sample shall not be less than 3 mm.

(3) GWIT: The lowest temperature at which the material ignites and the burning time exceeds 5 seconds when the heating element is in contact with the sample, the unit is ° C. The GWIT test is carried out according to the relevant regulations in IEC-60335, and the thickness of the sample is 1.5 mm.

TABLE 1

Composition ratio and various performance test results of polyamide composites
of Examples and Comparative Example 1

| | Example 1 | Example 2 | Example 3 | Example 4 | Example 5 | Example 6 | Example 7 | Comparative Example 1 |
|---|---|---|---|---|---|---|---|---|
| Polyamide A | 50 | | 50 | 50 | 50 | 50 | 50 | 50 |
| Polyamide B | | 50 | | | | | | |
| Red phosphorus flame retardant A | 12 | 12 | | | 12 | 12 | 25 | 12 |
| Red phosphorus flame retardant B | | | 12 | | | | | |
| Red phosphorus flame retardant C | | | | 12 | | | | |
| TMAIC | 2 | 2 | 2 | 2 | 2 | 4 | 2 | 2 |
| Chopped glass fiber A | 25 | 25 | 25 | 25 | | 25 | 25 | 25 |
| Chopped glass fiber B | | | | | 25 | | | |
| Flexibilizer | 2 | 2 | 2 | 2 | 2 | 2 | 2 | 2 |
| Colorant | 1 | 1 | 1 | 1 | 1 | 1 | 1 | 1 |
| Antioxidant | 0.2 | 0.2 | 0.2 | 0.2 | 0.2 | 0.2 | 0.2 | 0.2 |
| Flame retardant performance (0.8 mm) | V-0 | V-0 | V-0 | V-0 | V-0 | V-0 | V-0 | V-0 |
| CTI, V | 525 | 525 | 525 | 525 | 500 | 550 | 525 | 400 |
| GWIT, ° C. | 800 | 800 | 800 | 775 | 775 | 800 | 800 | 750 |

TABLE 2

Composition ratio and various performance test results of polyamide composites
of Comparative Example 2

| | Comparative Example 2 | Comparative Example 3 | Comparative Example 4 | Comparative Example 5 | Comparative Example 6 |
|---|---|---|---|---|---|
| Polyamide A | 50 | 50 | 50 | 50 | 50 |
| Red phosphorus flame retardant A | | | | 12 | 12 |
| Other flame retardant A | 12 | | | | |
| Other flame retardant B | | 12 | | | |
| Other flame retardant C | | | 12 | | |
| TMAIC | 2 | 2 | 2 | | |
| TAC | | | | 2 | |
| TAIC | | | | | 2 |
| Chopped glass fiber A | 25 | 25 | 25 | 25 | 25 |
| Flexibilizer | 2 | 2 | 2 | 2 | 2 |
| Colorant | 1 | 1 | 1 | 1 | 1 |
| Antioxidant | 0.2 | 0.2 | 0.2 | 0.2 | 0.2 |
| Flame retardant performance (0.8 mm) | V-2 | V-1 | V-2 | V-0 | V-0 |
| CTI, V | 475 | 450 | 475 | 475 | 475 |
| GWIT, ° C. | 750 | 750 | 750 | 750 | 775 |

The CTI performance is of great significance to the anti-leakage performance. For example, it is very difficult and meaningful to increase only 25V.

It can be seen from Example 3/4 that the red phosphorus content of the preferred red phosphorus flame retardant masterbatch is within the preferred range, and the GWIT performance is better.

It can be seen from Example 2/5 that the preferred glass fiber has better anti-leakage performance and GWIT.

As can be seen from Comparative Example 1, without irradiation cross-linking, the CTI and GWIT performances are poor except for the flame retardant performance.

It can be seen from Comparative Examples 2 to 4 that TMAIC must be compounded with red phosphorus flame retardant to improve the anti-leakage performance.

It can be seen from Comparative Examples 5 to 6 that traditional TAC and TAIC have poor CT and GWIT performance.

What is claimed is:

1. A polyamide composite, consisting of the following components:

20 to 80 parts of a polyamide resin;

1 to 30 parts of a red phosphorus flame retardant;

0.01 to 10 parts of trimethallyl isocyanurate;

0 to 50 parts of a glass fiber; and 0 to 10 parts of an additive, the polyamide composite has a cross-linked structure between polyamide molecules, wherein the additive is selected from at least one of a colorant, a flexibilizer and an antioxidant.

2. The polyamide composite according to claim 1, wherein the polyamide resin is selected from polyamide resins obtained by polycondensation of diamine units and dicarboxylic acid units, polyamide resins obtained by ring-opening polymerization of lactam units, and polyamide resins obtained by self-condensation of aminocarboxylic acid units, or a polyamide copolymer resin obtained by copolymerizing at least two of the above-mentioned units constituting these polyamide resins.

3. The polyamide composite according to claim 1, wherein the red phosphorus flame retardant is selected from a red phosphorus powder or a red phosphorus flame retardant masterbatch.

4. The polyamide composite according to claim 3, wherein in the red phosphorus flame retardant masterbatch, red phosphorus accounts for 10% to 15% of a total weight, the red phosphorus flame retardant masterbatch is coated with a coating material, and the coating material is selected from at least one of inorganic hydroxide, phenolic resin, epoxy resin and melamine formaldehyde resin.

5. The polyamide composite according to claim 1, wherein the glass fiber is selected from at least one of an E-glass fiber, an H-glass fiber, an R,S-glass fiber, a D-glass fiber, a C-glass fiber and a quartz glass fiber.

6. The polyamide composite according to claim 5, wherein the glass fiber is selected from the E-glass fiber.

7. The polyamide composite according to claim 5, wherein the glass fiber has a diameter of 7 to 18 microns.

8. A preparation method of the polyamide composite according to claim 1, comprising the following steps: weighing the polyamide resin, the red phosphorus flame retardant, the trimethallyl isocyanurate, and the additive in proportion, and premixing in a high-speed mixer to obtain a premix, and then putting the premix into a twin-screw extruder for melt mixing, and extruding and granulating to obtain a workpiece; wherein, a screw length-diameter ratio of the twin-screw extruder is 40:1 to 48:1, a screw barrel temperature is 240° C. to 300° C., and a screw speed is 200 to 550 rpm; the extruded and granulated polyamide composite is injection-molded, with an injection moulding temperature of 270° C. to 300° C., and an injection moulding pressure of 55 to 100 MPa; and performing an irradiation cross-linking treatment to the workpiece, during the treatment, using an electron beam as an irradiation source, with an irradiation dose of 15 to 25 Mrad, to obtain the polyamide composite.

9. The polyamide composite according to claim 6, wherein the glass fiber has a diameter of 7 to 18 microns.

* * * * *